(12) United States Patent
Leland et al.

(10) Patent No.: US 10,683,408 B2
(45) Date of Patent: Jun. 16, 2020

(54) USE OF AGENTS TO REDUCE CRYSTALLINITY IN POLYPROPYLENE FOR BOPP APPLICATIONS

(71) Applicant: FINA TECHNOLOGY, INC., Houston, TX (US)

(72) Inventors: Mark Leland, Houston, TX (US); Jill Lawton, Deer Park, TX (US); Likuo Sun, Houston, TX (US); Leonardo Rodriguez Cortes, League City, TX (US); Enrique Vazquez, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 57 days.

(21) Appl. No.: 15/796,547

(22) Filed: Oct. 27, 2017

(65) Prior Publication Data

US 2018/0118919 A1   May 3, 2018

Related U.S. Application Data

(60) Provisional application No. 62/414,111, filed on Oct. 28, 2016.

(51) Int. Cl.
*C08K 5/098* (2006.01)
*C08J 5/18* (2006.01)

(52) U.S. Cl.
CPC ............... *C08K 5/098* (2013.01); *C08J 5/18* (2013.01); *C08J 2323/12* (2013.01); *C08J 2323/14* (2013.01); *C08K 2201/019* (2013.01)

(58) Field of Classification Search
CPC .................. C08K 5/098; C08J 5/18
USPC ........................................... 524/394
See application file for complete search history.

(56) References Cited

U.S. PATENT DOCUMENTS

| | | | |
|---|---|---|---|
| 4,298,718 A | 11/1981 | Mayr et al. | |
| 4,543,399 A | 9/1985 | Jenkins, III et al. | |
| 4,544,717 A | 10/1985 | Mayr et al. | |
| 4,588,790 A | 5/1986 | Jenkins, III et al. | |
| 4,767,735 A | 8/1988 | Ewen et al. | |
| 4,794,096 A | 12/1988 | Ewen | |
| 4,975,403 A | 12/1990 | Ewen | |
| 5,028,670 A | 7/1991 | Chinh et al. | |
| 5,158,920 A | 10/1992 | Ewen | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,416,228 A | 5/1995 | Ewen et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,616,661 A | 4/1997 | Eisinger et al. | |
| 5,627,242 A | 5/1997 | Jacobsen et al. | |
| 5,665,818 A | 9/1997 | Tilston et al. | |
| 5,668,228 A | 9/1997 | Chinh et al. | |
| 5,677,375 A | 10/1997 | Rifi et al. | |
| 5,789,502 A | 8/1998 | Shamshoum et al. | |
| 5,807,800 A | 9/1998 | Shamshoum et al. | |
| 5,968,864 A | 10/1999 | Shamshoum et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,225,251 B1 | 5/2001 | Shamshoum et al. | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,415 B1 | 10/2001 | Okayama et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,359,072 B1 | 3/2002 | Whaley | |
| 6,380,328 B1 | 4/2002 | McConville et al. | |
| 6,420,580 B1 | 7/2002 | Holtcamp et al. | |
| 6,432,860 B1 | 8/2002 | Shamshoum et al. | |
| 6,468,936 B1 | 10/2002 | Reddy et al. | |
| 6,579,962 B1 | 6/2003 | Wheat et al. | |
| 6,653,254 B1 | 11/2003 | Shamshoum et al. | |
| 6,777,366 B2 | 8/2004 | Gauthier et al. | |
| 6,777,367 B2 | 8/2004 | Gauthier et al. | |
| 7,056,991 B2 | 6/2006 | Tharappel et al. | |
| 2004/0033349 A1 | 2/2004 | Henderson | |
| 2009/0305069 A1 | 12/2009 | Goeldel et al. | |
| 2015/0072127 A1 | 3/2015 | Bayona et al. | |
| 2016/0145412 A1* | 5/2016 | Lake, Jr. ................. | B32B 27/18 524/396 |

OTHER PUBLICATIONS

International Search Report and Written Opinion issued in Application No. PCT/US17/58861, dated Jan. 29, 2018, 8 pages.

* cited by examiner

*Primary Examiner* — Deve V Hall
(74) *Attorney, Agent, or Firm* — Albert Shung

(57) ABSTRACT

The BOPP film includes a polypropylene, an absence of a nucleating agent, and an additive blended with the polypropylene forming a polypropylene/additive blend, wherein the additive is potassium stearate.

7 Claims, 3 Drawing Sheets

USE OF AGENTS TO REDUCE CRYSTALLINITY IN POLYPROPYLENE FOR BOPP APPLICATIONS

CROSS-REFERENCE TO RELATED APPLICATIONS

This application is a nonprovisional application that claims priority from U.S. provisional application No. 62/414,111, filed Oct. 28, 2016.

STATEMENT REGARDING FEDERALLY SPONSORED RESEARCH OR DEVELOPMENT

Not applicable.

REFERENCE TO A MICROFICHE APPENDIX

Not applicable

BACKGROUND

Technical Field

This disclosure relates to biaxially oriented polypropylene (BOPP) films and the manufacture thereof.

Background

Biaxially oriented polypropylene (BOPP) film is used in a wide variety of flexible packaging applications. In the BOPP process, polypropylene is cast to form a sheet that is partially or wholly crystallized. The sheet is then biaxially oriented to form a thin film. As used herein, the term "biaxial orientation" refers to a process in which a polymeric composition is heated to a temperature at or above its glass-transition temperature. Immediately following heating, the material may then be extruded into a film, and stretched in both a longitudinal direction (i.e., the machine direction) and in a transverse or lateral direction (i.e., the tenter direction). Such stretching may be carried out simultaneously or sequentially.

SUMMARY

An embodiment of the present disclosure includes a BOPP film. The BOPP film includes a polypropylene, an absence of a nucleating agent, and an additive blended with the polypropylene forming a polypropylene/additive blend, wherein the additive is potassium stearate.

In another embodiment of the present disclosure, a process of manufacturing a BOPP film is disclosed. The process includes blending polypropylene with an additive to form a polypropylene/additive blend without adding a nucleating agent, wherein the additive is potassium stearate, casting the polypropylene/additive blend to form a sheet, and biaxially orienting the sheet to form a thin film.

In another embodiment of the present disclosure, a method of reducing the crystallization rate during processing of BOPP films is disclosed. The method includes blending polypropylene with an additive to form a polypropylene/additive blend without adding a nucleating agent and forming a thin film from the propylene/additive blend, wherein the additive is potassium stearate.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
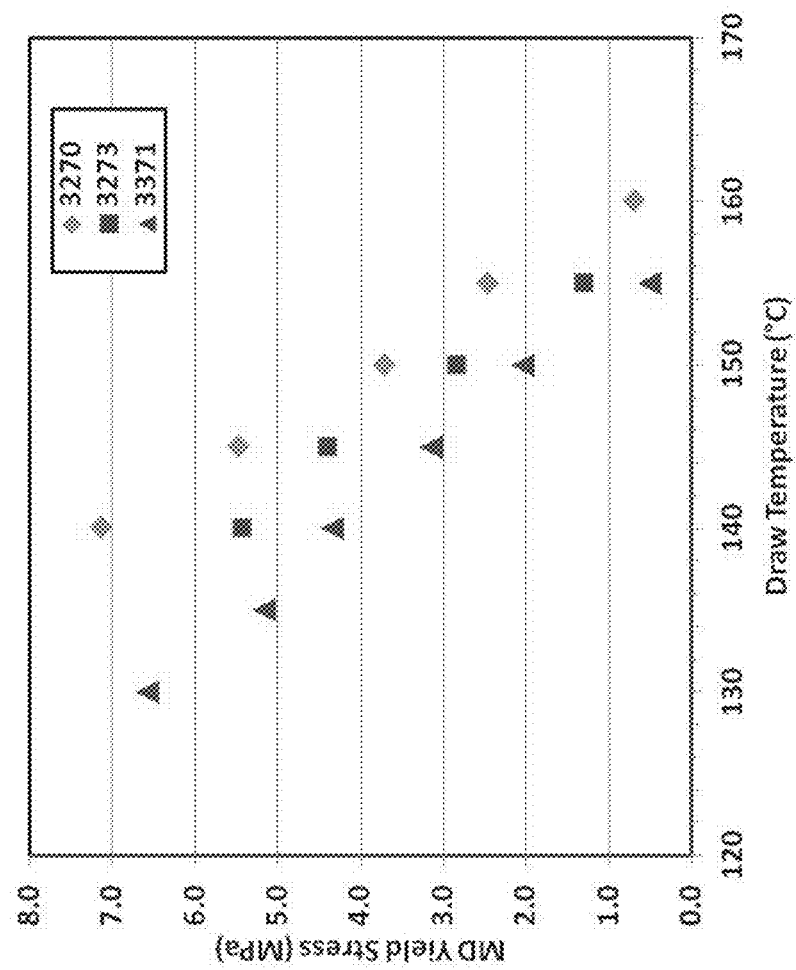
FIG. 1 is a graph depicting the value of yield stress in the machine direction as a function of heating temperature as measured by the Bruckner Karo IV Laboratory Stretcher for polypropylene grades 3270, 3273, and 3371.

A detailed description will now be provided. The description includes specific embodiments, versions and examples, but the disclosure is not limited to these embodiments, versions or examples, which are included to enable a person having ordinary skill in the art to make and use the disclosure when that information is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Disclosed herein are polymeric compositions and articles made therefrom. In some embodiments, the polymeric compositions include polyolefins, including, but not limited to polypropylene. Non-limiting examples of suitable polyolefins in this disclosure include homopolymers and copolymers of polypropylene.

In an embodiment, the polyolefin is polypropylene. The polypropylene may be a homopolymer. Polypropylene homopolymers suitable for use in this disclosure may include any type of polypropylene. For example, the polypropylene homopolymer may be atactic polypropylene, isotactic polypropylene, hemi-isotactic polypropylene, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In an embodiment, a polypropylene homopolymer suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 50 g/10 min., alternatively from 1.0 g/10 min. to 10 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Non-limiting examples of polypropylene homopolymers suitable for use in this disclosure include without limitation 3371, 3273, and 3270, which are polypropylene homopolymers commercially available from Total Petrochemicals & Refining USA, Inc. In an embodiment, the polypropylene homopolymer (e.g., 3371) has generally the physical properties set forth in Table 1.

TABLE 1

| Properties | 3371 Typical Value | Test Method |
|---|---|---|
| Physical | | |
| Density, g/cc | 0.905 | ASTM D1505 |
| Melt Flow Rate (MFR), g/10 min. | 2.8 | ASTM D1238 |
| Melting Point (DSC), ° F. (° C.) | 325 (163) | DSC |
| Oriented Film Properties | | |
| Haze | 1% | ASTM D1003 |
| Gloss 45° | 90% | ASTM D2457 |
| Elongation | 130% MD, 50% TD | ASTM D882 |
| Ultimate Tensile | 19,000 psi MD, 38,000 psi TD | ASTM D882 |
| Tensile Modulus | 350,000 psi MD, 600,000 psi TD | ASTM D882 |
| WVTR | 0.3 g/100 in 2/24 hrs/mil @ 100° F., 90% RH | ASTM F-1249-90 |

In another embodiment, the polypropylene may be a high crystallinity polypropylene homopolymer (HCPP). The HCPP may contain primarily isotactic polypropylene. The isotacticity in polymers may be measured via $^{13}C$ NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 95%, or greater than 98%, or greater than 99%. The HCPP may comprise some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 500 g/10 min., alternatively from 1.0 g/10 min. to 100 g/10 min., and alternatively from 1.5 g/10 min. to 20 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F-1249-90.

An example of an HCPP suitable for use in this disclosure includes without limitation 3270, which is an HCPP commercially available from Total Petrochemicals & Refining USA, Inc. The HCPP (e.g., 3270) may generally have the physical properties set forth in Table 2.

TABLE 2

| Properties | 3270 Typical Value | Test Method |
|---|---|---|
| Physical | | |
| Density, g/cc | 0.91 | ASTM D1505 |
| Melt Flow Rate (MFR), g/10 min. | 2.0 | ASTM D1238 |
| Melting Point (DSC), ° F. (° C.) | 329 (165) | DSC |

TABLE 2-continued

| Properties | 3270 Typical Value | Test Method |
|---|---|---|
| Oriented Film Properties | | |
| Haze | 1% | ASTM D1003 |
| Gloss 45° | 85% | ASTM D2457 |
| Elongation | 150% MD, 60% TD | ASTM D882 |
| Ultimate Tensile | 28,000 psi MD, 39,000 psi TD | ASTM D882 |
| Tensile Modulus | 420,000 psi MD, 700,000 psi TD | ASTM D882 |
| WVTR | 0.2 g/100 in 2/24 hrs/mil @ 100° F., 90% RH | ASTM F-1249-90 |

Another example of an HCPP is 3273, which is an HCPP commercially available from Total Petrochemicals & Refining USA, Inc. 3273 may generally have the physical properties set forth in Table 3.

TABLE 3

| Properties | 3273 Typical Value | Test Method |
|---|---|---|
| Physical | | |
| Density, g/cc | 0.905 | ASTM D1505 |
| Melt Flow Rate (MFR), g/10 min. | 2.0 | ASTM D1238 |
| Melting Point (DSC), ° F. (° C.) | 325 (163) | DSC $_{(2)}$ |
| Oriented Film Properties | | |
| Haze | 1% | ASTM D1003 |
| Gloss 45° | 85% | ASTM D2457 |
| Elongation | 150% MD, 60% TD | ASTM D882 |
| Ultimate Tensile | 24,000 psi MD, 38,000 psi TD | ASTM D882 |
| Tensile Modulus | 400,000 psi MD, 686,000 psi TD | ASTM D882 |
| WVTR | 0.25 g/100 in 2/24 hrs/mil @ 100° F., 90% RH | ASTM F-1249-90 |

In another embodiment, the polypropylene may be a polypropylene copolymer. In certain embodiments, the polypropylene copolymer may be a propylene random copolymer. Examples of polypropylene copolymers include propylene random copolymers made from Zieger-Natta catalysts, such as the 6000-, 7000-, and 8000-series commercially available from Total Petrochemicals & Refining USA, Inc. In other embodiments, the propylene-based polymers may be a "mini-random" polypropylene. A mini-random polypropylene has less than about 1.0 wt % of the comonomer. In certain embodiments, the comonomer in the mini-random polypropylene is ethylene.

In another embodiment, the polypropylene is a high melt strength polypropylene. A high melt strength polypropylene may be a semi-crystalline polypropylene or polypropylene copolymer matrix containing a heterophasic copolymer. The heterophasic copolymer may include ethylene and higher alpha-olefin polymer such as amorphous ethylene-propylene copolymer, for example.

Polyolefins suitable for use in this disclosure may be prepared using any suitable method. For example, the polyolefin may be prepared using a Ziegler-Natta catalyst, metallocene catalyst, or combinations thereof. The polyethylene, for example, may be prepared using a chromium oxide catalyst, or any other suitable catalysts.

In an embodiment, the polyolefin is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are described in U.S. Pat. Nos. 4,298,718; 4,544,717; and 4,767,735, each of which is incorporated by reference herein in its entirety.

In another embodiment, the polyolefin may be prepared using a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through π bonding. Examples of metallocene catalysts and processes for forming such catalysts are described in U.S. Pat. Nos. 4,794,096 and 4,975,403, each of which is incorporated by reference herein in its entirety. Examples of polyolefins prepared through the use of metallocene catalysts are described in further detail in U.S. Pat. Nos. 5,158,920; 5,416,228; 5,789,502; 5,807,800; 5,968,864; 6,225,251; 6,777,366; 6,777,367; 6,579,962; 6,468,936; 6,579,962; and 6,432,860, each of which is incorporated by reference herein in its entirety.

The polyolefin may also be prepared using any other catalyst or catalyst system such as a combination of Ziegler-Natta and metallocene catalysts, for example as described in U.S. Pat. Nos. 7,056,991 and 6,653,254, each of which is incorporated by reference herein in its entirety.

The polyolefin may be formed by placing one or more olefin monomers alone or with other monomers in a suitable reaction vessel in the presence of a catalyst (e.g., Ziegler-Nana, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polyolefin is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig, or from 250 psig to 350 psig. The reactor temperature in a gas phase process may vary from 30° C. to 120° C., or from 60° C. to 115° C., or from 70° C. to 110° C., or from 70° C. to 95° C., for example as described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polyolefin is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

The BOPP film may be formed as described above. In the orientation process, previous crystal regions in the polypropylene sheet may be destroyed and then reformed to produce a high level of crystallinity with strong directional components in the two directions of orientation, i.e., MD and TD. The high level of crystallinity may result in high stiffness, and high barrier and tensile strength in the BOPP film.

In certain embodiments, the orientation process is a solid state orientation process, which may result in the destruction of crystal regions formed in the initial casting step, such as through heat and force. The rate at which polypropylene is processed to produce BOPP film may be limited by the ability to sufficiently heat the material to reduce the crystalline content, to the amount of force, as a function of the rate at which force is applied, that can be applied to the sheet, or both. For instance, when excessive force is applied at too high of a rate, the film may break or fail to uniformly orient.

Heat may be applied to the film through induction prior to each orientation step. Heat transfer limitations will limit the speed at which a material can be processed. In addition, increasing the temperatures used to heat the film during processing may result in film adherence to surfaces contacted during processing.

The level of crystallinity in the sheet may impact the amount of force and heat for drawing the thin film during processing. A film with higher crystallinity in the sheet may necessitate higher temperatures during heating, longer exposure to elevated temperature, or more force to draw compared to sheets with lower crystallinity. By reaction control during manufacture of the polypropylene, it is possible to control the level of crystallinity of the polypropylene manufactured. The level of crystallinity may be measured by the amount of polypropylene that will extract in hot xylene as a weight percentage (% XS) with more polypropylene extracting in lower crystallinity materials. Table 5 shows % XS for 3270, 3273, and 3371. While 3270, 3273, and 3371 are all homopolymer polypropylenes, each of 3270, 3273, and 3371 differ in molecular architecture giving rise to the differences in % XS.

Table 4 shows the level of crystallinity as measured by the percentage of extractable content in hot xylene (XS) and by C13 NMR (expressed as a mol % of meso repeating units) for 3270, 3273, and 3371. The data demonstrates that the three materials differ distinctly in crystallinity with the crystallinity of 3270 being higher than 3273 which is in turn higher than 3371.

TABLE 4

| Value | 3270 | 3273 | 3371 | Units |
|---|---|---|---|---|
| Xylene Solubles (XS) | 0.9 | 1.9 | 4.2 | % |
| %meso (NMR) | 99 | 96 | 93 | mol % |
| %mmmm (NMR) | 98 | 94 | 89 | % |

In some embodiments, 3270 is more difficult to process than 3273; 3273 may be more difficult to process than 3371. Higher crystallinity polypropylene may necessitate more heat and consequently slower processing speeds than lower crystallinity material. This effect is further illustrated in FIG. 1, which illustrates the force to orient the 3270, 3273, and 3371 as measured on a Bruckner Karo IV Laboratory Stretcher at various draw temperatures. FIG. 1 shows the value of yield stress in the machine direction (MD) as a function of heating temperature as measured by the Bruckner Karo IV Laboratory Stretcher for 3270, 3273, and 3371. The figure demonstrates that more force is used to orient the sheet in higher crystallinity materials at any given heating temperature. While crystallinity may be altered during the formation of the polypropylene resin, reducing the crystallinity of the polypropylene resin may have an adverse impact on the final film properties. For instance, lower crystallinity polypropylene resins may lead to films with lower stiffness and barrier properties.

The level of crystallinity may also be controlled in the manner in which the sheet is formed. Lower formation temperatures of the sheet may be used to lower the crystallinity of the sheet to afford lower orientation forces and/or reheating temperatures. Without being bound by theory, a high level of supercooling may lead to less crystal perfection and lower level of crystallinity.

In some embodiments of the present disclosure, an additive may be used to suppress or slow crystallization, i.e., reduced the rate of crystallization, in a polypropylene material in order to reduce the force and/or temperature used to orient the material while still resulting in a film of the same properties. The additive may allow for higher processing speeds in polypropylene in which the additive is introduced without compromising the final film properties as shown in Table 5 for films oriented on the Bruckner Karo IV Laboratory Stretcher at a 5 by 5 draw ratio at 150° C. In certain embodiments, the concentration of the additive in the polypropylene may be between 100 ppm and 2000 ppm, between 400 ppm and 600 ppm, or about 500 ppm.

TABLE 5

| Value | 3270 | 3270 + Additive |
|---|---|---|
| Film Thickness, mil | 0.6 | 0.6 |
| MD Tensile 1% Secant Modulus, kpsi | 328 | 334 |
| MD Tensile Strength Break, psi | 31000 | 31100 |
| MD Elongation, Break, % | 120 | 130 |
| TD Tensile 1% Secant Modulus, kpsi | 350 | 340 |
| TD Tensile Strength Break, psi | 34000 | 32900 |
| TD Elongation, Break, % | 110 | 110 |
| Transmittance, % | 94.1 | 94.2 |
| Haze, % | 0.4 | 0.3 |
| Falling Dart, $g_f$ | 220 | 230 |

Figure 2:
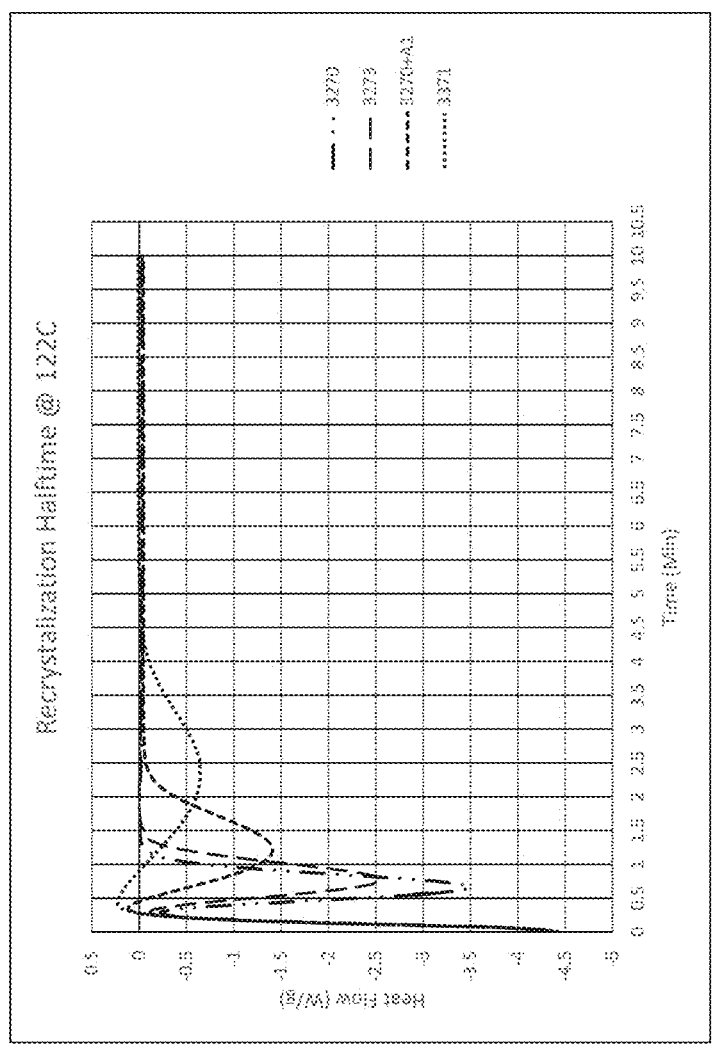
FIG. 2 is a graph depicting time for recrystallization halftime at 122° C. versus heat flow for polypropylene grades 3270, 3273, and 3371.
Figure 3:
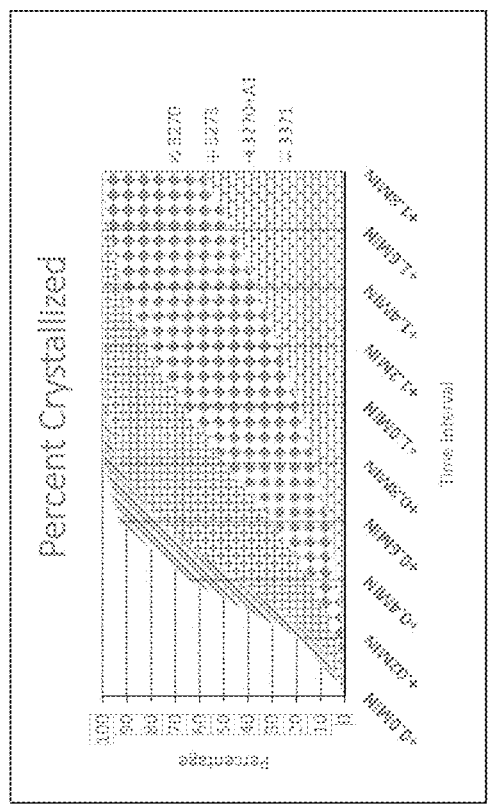
FIG. 3 is a graph depicting the percentage of material crystallized for polypropylene grades 3270, 3270 with an additive, 3273, and 3371, as a function of time.

An example of such an additive is potassium stearate. FIG. 2 illustrates the effect of the addition of the additive on the crystallization of 3371, 3273, and 3270. FIG. 2 depicts time for recrystallization halftime at 122° C. versus heat flow. Comparing the crystallization of 3371, 3273, and 3270, it is apparent that as crystallinity increases the onset of crystallization becomes more rapid (FIG. 2). This is accompanied by an increase in the force to orient at a given temperature (FIG. 1). This behavior may be important in a dynamic process such as BOPP orientation. Due to the slow nature of crystallization of polypropylene compared to other materials, polypropylene may only be partially crystallized during the BOPP process. If the crystallization process can be slowed, at any given point in the BOPP process, the weight fraction of crystallinity in a cast sheet will be lower. FIG. 3 shows the percentage of material crystallized for materials with different levels of inherent crystallinity as a function of time. The effect of the addition of an additive—potassium stearate—(Al) on the crystallization of a high crystallinity product is to induce the material to behave more like a low crystallinity product as also shown in FIG. 3. The concentration of the potassium stearate in the polypropylene was 500 ppm. Thus, polypropylene having an additive is expected to process more like a lower crystallinity polypropylene requiring less heat, lower induction time, and higher process speeds. Thus, unexpectedly, the additive/polypropylene blend has a lower crystallization temperature than an identical polypropylene without the additive, regardless of the presence of other agents such as nucleating agents. However, because structure of the final film is induced through orientation in the BOPP process, the final BOPP film properties, i.e., haze, gloss 45°, elongation, ultimate tensile, tensile modulus, and WVTR, are not found to be negatively impacted by the additive. In certain embodiments, no nucleating agent is added to the polypropylene or to the polypropylene/additive blend. Unexpectedly, potassium stearate reduces crystallization temperature of the polypropylene/additive blend even in the absence of a nucleating agent. Further, in certain embodiments, the additive is added to the polypropylene during manufacturing or during a secondary step.

In certain embodiments, the BOPP films are single layer films. In other embodiments, the BOPP films may form one or more layers of a multilayer film. The additional layers of the multilayer film may be any coextrudable film known in the art, such as syndiotactic polypropylene, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons, and the like, or combinations thereof.

What is claimed is:

1. A process of manufacturing a BOPP film comprising:
   blending polypropylene with an additive to form a polypropylene/additive blend without adding a nucleating agent, wherein the additive is potassium stearate;
   casting the polypropylene/additive blend to form a sheet, wherein the sheet consists essentially of the propylene/additive blend wherein the level of crystallinity in the sheet during processing is less than if the additive had not been blended with the polypropylene; and
   biaxially orienting the sheet to form a thin film.

2. The process of claim 1, wherein the concentration of potassium stearate in the polypropylene/additive blend is between 100 ppm and 2000 ppm.

3. The process of claim 1, wherein a speed of crystallization in the process of manufacturing the BOPP film is slower than if the additive had not been blended with the polypropylene.

4. The process of claim 1 wherein the process of manufacturing the BOPP film requires less heat, has a lower induction time, has a higher process speed or a combination thereof than if the additive had not been blended with the polypropylene.

5. The process of claim 1, wherein a crystallization rate in the thin film during processing is less than if the additive had not been blended with the polypropylene.

6. The process of claim 1, wherein the haze, gloss 45°, elongation, ultimate tensile, tensile modulus, and WVTR of the thin film are not negatively impacted by the addition of the additive.

7. The process of claim 1, wherein at any point during the steps of casting the polypropylene/additive blend to form a sheet and biaxially orienting the sheet to form a thin film the crystallinity will be lower than if the additive had not been blended with the polypropylene.

* * * * *